FAULT SIGNALING SYSTEM FOR COUNTING CHAIN

Filed Aug. 31, 1950 2 Sheets-Sheet 1

INVENTORS W. H. T. HOLDEN
E. R. MORTON
BY J. W. Schmied
ATTORNEY

INVENTORS W. H. T. HOLDEN
E. R. MORTON
BY J W Schmied
ATTORNEY

Patented Aug. 3, 1954

2,685,683

UNITED STATES PATENT OFFICE 2,685,683

FAULT SIGNALING SYSTEM FOR COUNTING CHAIN

William H. T. Holden, Woodside, and Edmund R. Morton, Brooklyn, N. Y., assignors to Bell Telephone Laboratories, Incorporated, New York, N. Y., a corporation of New York Application August 31, 1950, Serial No. 182,469

20 Claims. (Cl. 340—253)

This invention relates generally to signaling systems and more particularly to arrangements in such systems for detecting, counting, and registering signal impulses.

The main object of the present invention is the improvement of such detecting, counting and registering arrangements, particularly with reference to the rapidity of response to signal impulses and to the reliability of operation in response to such impulses.

In present-day signaling systems, such as may be useful with automatic telephone systems for instance, continuous improvement is being sought to increase the speed of response and to improve the reliability of circuits used for detecting, counting, and registering signals. In the telephone art in particular, continuous effort is expended towards devising and developing circuits which will respond more accurately and more reliably at a rapid rate to signals, such for instance as dial pulses or the like.

The present invention, while not necessarily restricted thereto as regards its utility or scope, finds ready application in automatic telephone systems where apparatus and circuits are necessary to accomplish these pulse detection, counting, and registering functions. An exemplary embodiment of the present invention is shown herein as capable of being incorporated in an automatic telephone system of the cross-bar type, such as that disclosed in Patent 2,585,904 to A. J. Busch of February 19, 1952. A skeletonized disclosure of the system shown in the Busch disclosure is set forth in Patent 2,616,974 to J. W. Dehn of November 4, 1952. The Dehn disclosure shown details of an originating register circuit of the cross-bar system, which circuit is comparable in context and function to the disclosure herein chosen as an exemplary embodiment of the present invention.

The function of an originating register, among others, in the cross-bar system disclosed by Busch and Dehn, is to receive, to detect, to count, and to register dial pulse digits transmitted thereto under the control of a calling subscriber during the initiation by the latter of a request for a telephone connection.

An object of the present invention is the improvement of such circuitry as the above-mentioned originating register circuits in regard to the reliability of the functioning thereof and the rapidity of response thereby to signal impulses.

A specific object of the present invention is the provision of improved circuit means for enabling such circuits to be self-checking with regard to the accuracy and reliability with which they respond to signal impulses.

The present invention, in one of its aspects, contemplates means for detecting impulses, a chain of electron discharge devices for counting these impulses under the control of the detecting means, and means for checking the response of the counting chain to said impulses. The counting chain is arranged to be stepped from device to device along the chain in response to impulses of a series such that at the end of such a series the last device activated represents the pulse count of the series. Means is provided for recycling the chain at the end of each series of impulses in preparation for counting the pulse content of a succeeding series. A check circuit is provided for detecting the failure of any device in the counting chain to be activated when it is supposed to be activated in response to an impulse. This circuit comprises a group of electron discharge devices which cooperate with each other, with the impulse detecting means, and with the counting chain to measure a time delay. Signal means is energized through the agency of said group of devices if the devices in the counting chain do not respond properly to impulses within the said delay time. This aspect of the invention is in the nature of an improvement over a similar check circuit arrangement disclosed and claimed in Patent 2,597,428 to A. E. Bachelet of May 20, 1952.

The check circuit comprises more particularly a pair of electron discharge devices which are energized alternately by successive pulses. After each pulse the condition of the said pair of devices is compared to the condition of the counting chain such that, if either the pair or the chain has not progressed properly in response to a pulse, the non-coincidence of the progressions will effect the energizing of a third device to indicate trouble. However, in the event that the progressions of the pair and the chain properly coincide, then the third device will not be fired. In the latter instance, a fourth device will be energized to indicate proper response of the pair and of the chain to each pulse.

Still more specifically, the check circuit comprises a first device energized by each pulse, a second device energized by the energization of said first device after a measured time delay to indicate trouble, a pair of cooperating devices designated for instance as odd and even devices which are energized alternately by successive odd and even pulses as their names imply, a third device energizable to indicate satisfactory operation, and voltage responsive means for testing the progression of said odd and even devices with the progression of the connecting chain after each pulse such that for coincidence of said progressions said means energizes said third device and for non-coincidence said means energizes said second device, the energization of said third device being effective to deenergize said first device thereby to immobilize said delay time measuring means.

The invention, outlined above, will be explained with the aid of the following detailed disclosure of the exemplary embodiment thereof, the drawings forming a part of such disclosure being described generally as follows:

Fig. 1 shows the pulse receiving, detecting, and counting circuits of a cross-bar originating register circuit embodying the invention; and Fig. 2 shows the registers and steering circuits of the originating register embodying the invention.

GENERAL DESCRIPTION

The present invention is herein disclosed as embodied in circuits which may be used in an automatic telephone system such as is disclosed in the above-mentioned Busch disclosure. Busch discloses in detail a cross-bar system wherein originating register circuits are used for transmitting dial tone to calling subscribers, detecting and counting pulses of called digits, registering these called digits, and seizing an idle marker circuit for the purpose of having such a marker complete the desired connection. Since the present disclosure of the invention relates particularly to the pulse detection, counting, checking and registering functions of an originating register, details other than of such a circuit may be obtained from the Busch or Dehn disclosures.

As may be obtained from the Busch or Dehn disclosure, the general sequence of events during the originating of a call by a subscriber is as follows:

(1) The calling subscriber lifts his receiver thereby seizing an idler marker circuit and automatically informing the seized marker that a dial tone connection is desired;

(2) The seized marker tests for and seizes an idle originating register circuit;

(3) The marker interconnects the calling line with the seized originating register circuit over the cross-bar switch train and then the marker releases;

(4) The originating register transmits dial tone to the calling subscriber;

(5) The calling subscriber dials the digits of the called number or other desired destination;

(6) The originating register receives, detects, follows, and counts the pulses of each digit and registers such digit;

(7) When a sufficient number of digits have been registered therein, the originating register seizes an idle marker circuit and transfers thereto, among other items of information pertaining to the call, the digits so registered; and, (8) The marker, when it has received all of the information from the originating register, releases the originating register, completes the call, and then releases itself.

Since the present invention is described herein as embodied only in circuits of an originating register, the subsequent detailed description will not cover items (1), (7) and (8) above. Such matters, however, are fully disclosed by Busch and Dehn and are not necessary to the present description.

DETAILED DESCRIPTION

Figure 1:
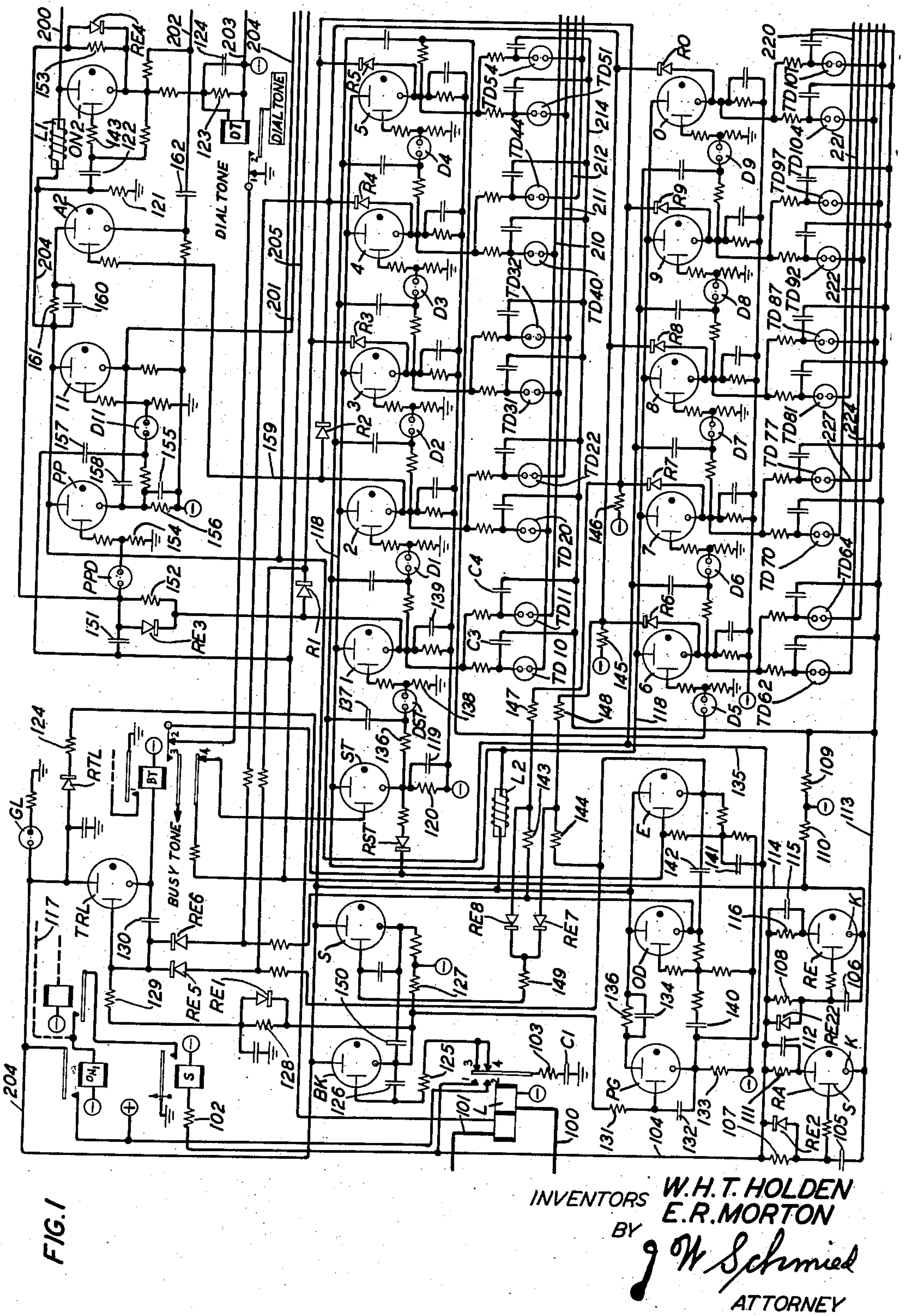

Hereinafter whenever a part of the drawing is referred to by its reference character, such as the off-normal relay ON(1), the designation "ON" refers to the reference character which identifies the part on the drawing, and the designation "(1)" refers to the figure of the drawing wherein that part is located. Thus the designation of relay "ON(1)" means the relay marked "ON" on Fig. 1, etc.

*Seizure of originating register*

Figure 2:
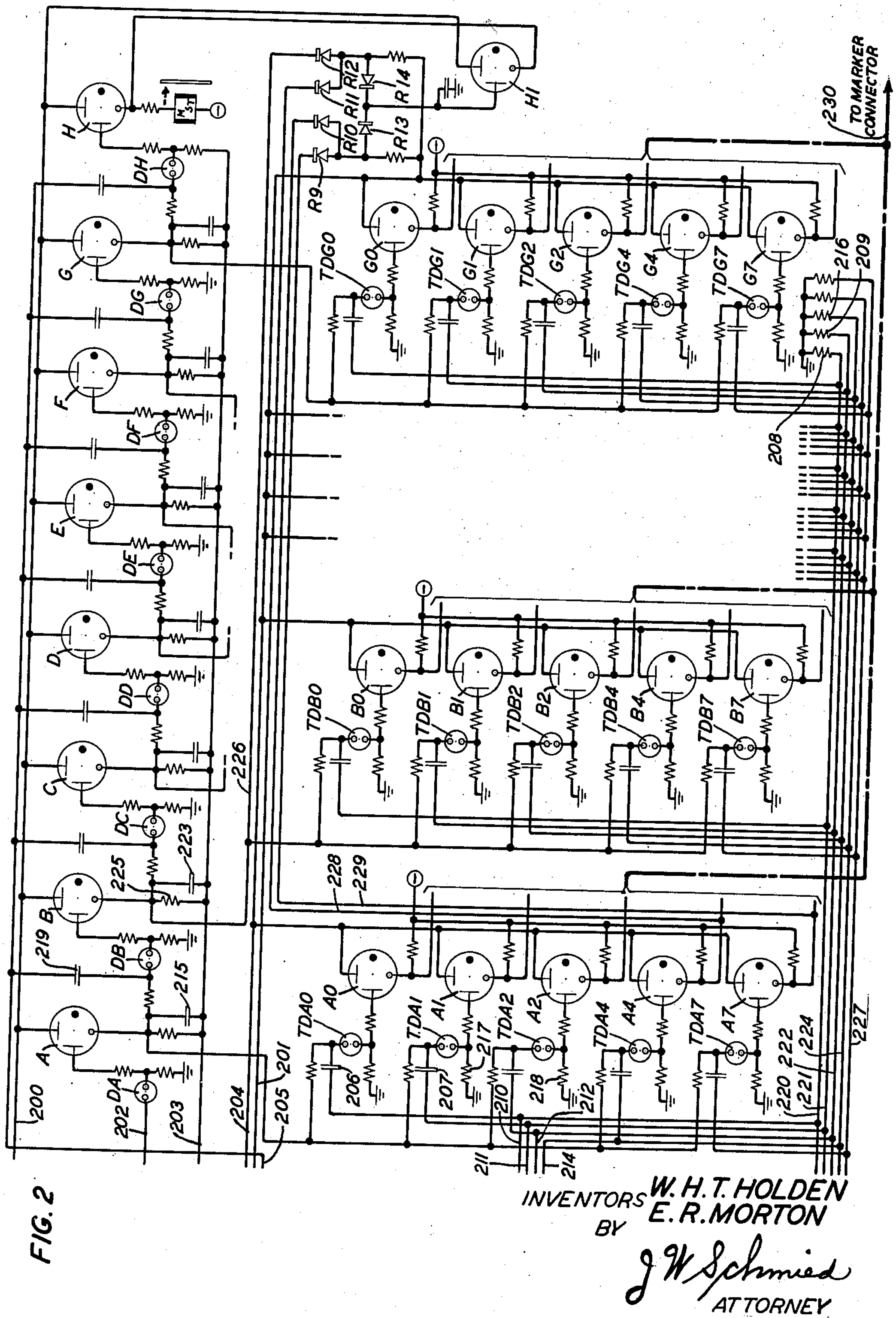

When the marker seizes an idle originating register circuit, such as is disclosed partly in Figs. 1 and 2, the off-normal relay ON(1) thereof is operated by the marker. This relay ON(1) will remain operated as long as the register circuit is being used or until the register is released prematurely for one of a number of possible reasons.

*Interconnection between calling subscriber and originating register*

After the seizure by a marker of an idle originating register circuit, the marker effects an interconnection over the cross-bar switch train between the seized register and the calling line, thereby closing the ring and tip conductors 100 and 101 of the register over the calling line loop. The line relay L(1) is operated in a circuit extending from ground, over contact 1 of the dial tone relay DT(1), contact 2 of the busy tone relay BT(1), left winding of relay L(1), tip conductor 101, over the switch train and the line loop, back over the ring conductor 100, right winding of relay L(1), to negative battery. (It is to be understood that whenever a voltage is indicated as negative or positive it is to be assumed that the opposite pole of the source is grounded unless otherwise designated or mentioned.)

Relay L(1), upon operating on the initial line loop closure performs three functions as disclosed:

(1) The slow-to-release relay S(1) operated in a circuit from negative battery, through the winding of relay S(1), through resistance 102, contacts 1 and 2 and armature of relay L(1), to positive battery. The relay S(1) is energized each time that relay L(1) is operated (closed line loop) and is permitted to start releasing each time relay L(1) is released (open line loop periods representing pulses of a digit). The slow-to-release characteristic of relay S(1) assists in making sure that relay S(1) does not release during the release time of relay L(1) representing pulses of a digit. There is another circuit phenomenon which further assists relay S(1) in remaining operated during the release time of relay L(1). Such phenomenon will be described presently.

(2) Condenser C1(1) acquires a charge in a circuit extending from positive battery (130 volts positive for instance), over contact 2 of relay L(1), armature of relay L(1), resistance 103, to ground through condenser C1(1). Condenser C1(1) acquires a positive charge upon its upper plate each time relay L(1) operates. This voltage will be approximately full battery potential (+130 volts). As will be described in detail hereinafter, this charge on condenser C1(1) is used as the pulsing source for controlling the counting chain and control tubes when relay L(1) releases in response to each open line loop pulse.

(3) Positive battery potential is applied over contacts 2 and 1 and armature of relay L(1), over conductor 104 to the circuits associated with the gas tubes RA(1) and RE(1). Tubes RA(1) and RE(1) are normally extinguished and therefore their cathodes K are at negative battery potential (say minus 50 volts with respect to ground). Positive battery potential applied to conductor 104 starts the charging of condensers 105 and 106 in parallel circuits extending from conductor 104, through resistances 107 and 108, condensers 105 and 106, resistances 109 and 110, to negative battery. The rectifiers, such as rectifier RE2(1) in shunt of resistance 107, have little if any effect upon the charging time of the condensers because the rectifiers are so poled as to represent relatively high impedances when the voltage at their arrows is negative with respect to the other terminal. (These rectifier units will be encountered throughout the discussion and it is to be understood that when the arrow terminal is more positive than the other terminal, these units represent low impedances and will pass large currents readily; however, as has been mentioned, when the voltage polarity is reversed, these units represent high impedances which however are finite—not open circuits.) The time constant of the charging circuit for condenser 106 is longer than that for condenser 105. Therefore, assuming that they are permitted to charge up at will, condenser 105 will acquire a sufficiently positive voltage on its left terminal, with respect to negative battery, to fire tube RA(1) before tube RE(1) is fired by its condenser 106. This time difference is important with regard to subsequent discussion. The time constants are arranged such that tubes RA(1) and RE(1) will both fire if relay L(1) remains operated long enough to represent the pause between digits (interdigital time) and will thus probably fire upon the long pause between the first operation of relay L(1) and the first pulse of the first digit.

When tube RA(1) fires, by virtue of condenser 105 having acquired sufficient voltage upon its left plate to break down the starter gap S—K, tube RA(1) will pass a surge of current which will by-pass the anode resistance 111 through condenser 112 which acts as a short-circuit under the transient condition. This current surge passing through the cathode resistance 109 raises the potential at the cathode K of tube RA(1) about 100 volts more positive; that is, to about plus 50 volts with respect to ground. This pulse is applied to conductor 113 for purposes to be explained later. Very shortly however, the condenser 112 becomes charged and loses its shunting effect thereby causing the anode potential of tube RA(1) to drop. This drop of anode potential in conjunction with the rise in cathode potential will extinguish tube RA(1). Tube RA(1) will not sustain another discharge until condenser 112 has dissipated its charge through resistance 111 and unless relay L(1) remains operated to recharge condenser 105. If relay L(1) remains operated for a sufficiently long time tube RA(1) will refire at regular intervals thereby providing plus 50-volt pulses at its cathode K over conductor 113. This initial application to conductor 113 of pulses of about 100 volts magnitude positive with respect to negative 50 volts (that is, plus 50 volts) have no effect upon the other circuits as well be appreciated from subsequent discussion.

Similarly, when tube RE(1) fires, a plus 50-volt pulse is applied to conductor 114 from the cathode K of tube RE(1). Tube RE(1), like tube RA(1), is self-extinguishing by virtue of the condenser 115 shunting the anode resistance 116. The pulses applied to conductor 114 by tube RE(1), as will be explained hereinafater, will fire the start tube ST(1) of the pulse counting chain but have no other effect at this time.

It will be observed that when relay L(1) is released for any reason, the condensers 105 and 106 will lose their accumulated charges in parallel discharge circuits from negative battery, resistances 109 and 110, condensers 105 and 106, rectifiers RE2(1) and RE22(1), conductor 104, resistance 102, to negative battery through the winding of relay S(1). By virtue of the fact that the positive charges on condensers 105 and 106 find rectifiers RE2(1) and RE22(1) low impedances for the discharges, the discharge times are always shorter than the charging times thus precluding the possibility of condensers 105 and 106 integrating short pulses. That is, condensers 105 and 106 will always start timing from the same reference level of time and charge. Furthermore, these discharge currents will assist relay S(1) in remaining operated during the release of relay L(1) representing open line loop pulsing periods.

Upon the operation of relay S(1), above described, a circuit is completed for operating relay ON1(1) from ground, over the contact of relay S(1), the contact of relay ON(1), to negative battery through the winding relay ON1(1). This ground extends to the sleeve of the switch connection over the dotted path 117 to hold the connection. Relay ON1(1), upon operating, applies positive battery (say 130 volts) over its contact to conductor 204 which supplies plate voltage to the tubes as well be described.

When relay ON1(1) operates, it fires the gas tube GL(1) in an obvious circuit. The tube GL(1) is continuously energized as long as relay ON1(1) is operated for the purpose of providing continuous light for keeping the rest of the gas tubes in the circuits energized so they will fire promptly and reliably. This, as will be obvious, is a well known "keep alive" means used extensively in gas tube circuits.

Upon the operation of relay ON1(1), positive anode voltage is supplied to the main anode of the start tube ST(1) of the counting chain (tube ST(1) through tube O(1) of Fig. 1) over conductor 204, through the retard coil L2(1), and over conductor 118. Tube ST(1) is normally extinguished thereby setting its cathode at minus 50 volts potential. When tube RE(1) applies the first 100-volt pulse (plus 50 volts) to conductor 114, this pulse is applied to the starter electrode of tube ST(1) from conductor 114 over contact 4 of relay BT(1) to tube ST(1). This pulse of plus 50 volts raises the starter electrode of tube ST(1) some 100 volts positive with respect to the cathode and thereby fires tube ST(1). A surge of current passes to negative battery, through condenser 119 (in shunt of the cathode resistance 120), across the main gap of tube ST(1), over conductor 118, through the retard coil L2(1), from positive battery on conductor 204. The presence of condenser 119 in shunt of resistance 120 comprises effectively a short-circuit across resistance 120 during the surge transient. This insures that the cathode of tube ST(1) will remain at a negative 50-volt potential for a delay time determined by the time required to charge up condenser 119. This delay time is used throughout the counting chain, as will be obvious from an inspection of the repetitive nature of the cathode circuits, for a purpose to be mentioned later. Eventually condenser 119 will become charged to the steady state cathode potential which will be approximately plus 50 volts. This potential is insufficient to fire the gas diode DST(1) connected between the cathode of tube ST(1) and the starter electrode of tube I(1). It will be noted when tube ST(1) was fired, condenser 137 was also included in a time delay charging circuit extending from negative battery, through the cathode resistance of tube PG(1), pulsing conductor 135, condenser 137, resistance 136, to the top of resistance 120, which, as has been explained, is attempting to rise to about plus 50 volts. If the condenser 119 were not present, condenser 137 would delay the rise of the plus 50 volt potential at the left electrode of the diode DST(1) a length of time necessary to charge condenser 137 to this newly applied potential. Thus the delay caused by the charging of condenser 137 could be used for the same purpose as condenser 119 as far as preventing the instant firing of diode DST(1) is concerned. The circuit, as shown, is arranged such that the time element represented by the combination of condenser 119 and resistance 120 is of the longer and controlling duration, although it should be remembered that condenser 137 does represent a time delay in the application of the plus 50 volt potential to the left electrode of tube DST(1).

When relay ON1(1) operated, positive voltage was applied over the contact thereof, over conductor 204, through rectifier RTL(1) and resistance 124, to the starter electrode of the even tube E(1). Since the cathode of tube E(1) is at minus 50 volts tube E(1) will fire thereupon raising its cathode to about plus 50 volts. This 100 volt pulse from the cathode of tube E(1) is useful as explained later in connection with the check circuits. It is to be noted that the starter electrode circuit of tube E(1) is also connected to the cathode of the start tube ST(1) by means of a rectifier unit RST(1) so poled that when tube ST(1) is fired the 100 volt positive pulse from the cathode of tube ST(1) will refire tube E(1). It will be obvious that any further pulses from tube RE(1) over conductor 114, assuming that relay L(1) is still initially operated, will have no further effect upon tubes ST(1) and E(1).

When relay ON1(1) operated, positive battery was applied over conductor 204, through the retard coil L1(1), to the main anode of the gas tube ON2(1). This positive potential is also applied to the starter electrode of tube ON2(1) from conductor 204, through resistance 121, condenser 122, and resistance 143. This fires tube ON2(1). Before tube ON2(1) fires its cathode, and thus conductor 202 is at approximately minus 50 volts and the dial tone relay DT(1) is released due to the fact that no current is flowing in the cathode resistance 123. When tube ON2(1) fires, its cathode remains temporarily at about negative 50 volts, by virtue of the condenser 124 shunting the cathode resistance 123 as previously explained, and then rises to about plus 50 volts when condenser 124 becomes charged. The voltage drop across resistance 123 thereupon operates relay DT(1). Relay DT(1), upon operating applies dial tone over its contact 2, contact 2 of relay BT(1), to the tip side of the line through the left winding of the line relay L(1).

Upon hearing dial tone, the calling subscriber may begin to dial the digits of the called subscriber's number, or other called destination.

*The pulse generation and check circuits*

A pulse is detected in the originating register by the release of the line relay L(1). This represents a momentary open circuit in the line which is, as is well known, the indication of a pulse.

When relay L(1) releases, relay S(1) remains operated and the firing condensers 105 and 106 of the tubes RA(1) and RE(1) are discharged as previously described.

When relay L(1) releases, the charge on condenser C1(1) is used to fire tube BK(1) in a circuit from condenser C1(1), through resistance 103, contacts 3 and 4 and armature of relay L(1), resistance 125, condenser 126 to negative battery through resistance 127. As soon as condenser 126 charges up, tube BK(1) will fire thereby raising its cathode some 100 volts to about +50 volts. The 100-volt positive pulse from the cathode of tube BK(1) is applied to three circuits: to the cathode of tube S(1) having no effect at this time; to the starter electrode of the trouble tube TRL(1) through a delay network; and, to the starter electrode of the pulse generation tube PG(1) through a delay network.

Condenser 130 in the starter electrode circuit of the trouble tube TRL(1) begins to acquire a positive charge in a circuit extending from the cathode resistance 127 of tube BK(1), through resistances 128 and 129, condenser 130, to negative battery through the busy tone relay BT(1). If condenser 130 is permitted to charge up for a sufficient length of time to fire tube TRL(1), the firing of such tube will operate relay BT(1). The operation of relay BT(1) will open at its contact 4 the firing circuit for the start tube ST(1) of the counting chain, will close over its contact 1 a circuit for sounding an alarm and for making the originating register busy so it may be tested, and over its contact 3 closes a busy tone signal over the tip 101 of the calling line through the left winding of the line relay L(1) to inform the calling subscriber to disconnect and to try again. If the other parts of the circuit function properly, certain means will cause the condenser 130 to discharge before it can fire the trouble tube TRL(1). Similarly, in the event that certain parts of the circuit malfunction, other means will insure that tube TRL(1) fires promptly even in advance of the time delay measured by condenser 130. These matters will be discussed as they appear in the subsequent description.

The positive 100-volt pulse from the cathode of tube BK(1) is applied to the starter electrode circuit of the pulse generation tube PG(1) through resistance 131, condenser 132, and cathode resistance 133 to negative battery. After a time delay of some 7 to 8 milliseconds condenser 132 will have accumulated a sufficient charge to fire tube PG(1). When tube PG(1) fires it is self-extinguishing by virtue of the condenser 134 shunting the anode resistance 136, as was the case with the tubes RA(1) and RE(1), but will conduct for a period of time representing a finite pulse width. Tube PG(1), upon firing, raises its cathode from −50 volts to about +50 volts and in so doing sends a 100-volt positive pulse out on the pulsing conductor 135 for advancing the pulse counting chain. Since the cathode of tube ST(1) is at +50 volts due to conduction through tube ST(1), the 100-volt pulse on conductor 135 will fire the gas diode DST(1), interconnecting the cathode of tube ST(1) and the starter electrode circuit of tube 1(1), through condenser 137. The resulting current surge through resistance 138 creates a positive pulse sufficient to fire tube 1(1). The relative magnitudes of resistances 138 and 136 are such that the voltage produced across resistance 138 when tube DST(1) fires, is due mostly to the pulse from condenser 137 and very little from the direct current connected to diode DST(1). Condenser 139 in the cathode circuit of tube 1(1) keeps the cathode at −50 volts long enough to prevent the pulse on conductor 135 from also firing the gas diode D1(1). Eventually the cathode of tube 1(1) will rise to +50 volts to condition the diode D1(1) to be fired on the next pulse on conductor 135.

When tube 1(1) fires, the resulting current surge through the retard coil L2(1) drops the anode voltage of tube ST(1) and, since condenser 119 retains the +50-volt potential on the cathode of tube ST(1) for a short period of time, tube ST(1) becomes extinguished by anode commutation. Thereafter the cathode of tube ST(1) reverts to minus 50-volt potential in order to prevent the refiring of diode DST(1) and tube 1(1) unless tube ST(1) is itself refired first. This counting chain interaction arrangement is disclosed and claimed in Patent 2,616,627 to W. H. T. Holden of November 4, 1952.

When tube PG(1) fires, the 100-volt positive pulse from the cathode thereof also is applied in parallel circuits through condensers 140 and 141 to the starter electrodes of respective odd and even tubes OD(1) and E(1). Since tube E(1) is conducting, the positive pulse applied to the starter electrode thereof will have no effect. However, the positive pulse, when applied through condenser 140, will fire the odd tube OD(1). This conduction in tube OD(1) raises its cathode from −50 volts to about +50 volts. This positive pulse of 100 volts, when applied through the commutating condenser 142 to the cathode of the even tube E(1), extinguishes tube E(1) by cathode commutation.

The cathode of the odd tube OD(1) is connected through resistance 143 to the arrow terminal of rectifier RE8(1). The arrow side of rectifier RE8(1) is also connected through resistance 147 to the right terminal of a load resistance 146 which is common to the cathodes of all of the odd counting tubes 1(1), 3(1), 5(1), 7(1) and 9(1). Whenever an odd counting tube is conducting, such as tube 1(1) responsive to the first pulse, the rectifier R1(1) connecting the cathode thereof to the common resistance 147 drives the right-hand terminal of such resistance 147 to a potential substantially that of the conducting cathode; that is, about +50 volts. If the odd tube OD(1) is conducting, its cathode will be at approximately +50 volts also. The resistances 143 and 147 are so arranged that the junction therebetween will assume a potential which is the average of the two potentials derived from the odd tube OD(1) and from the odd counting tubes 1(1), 3(1), 5(1), 7(1) and 9(1). Thus, if the odd tube OD(1) is conducting and if one of the odd counting tubes is also conducting, then the arrow terminal of rectifier RE8(1) will be at +50 volts. Similarly, if the odd tube OD(1) is extinguished and all of the odd counting tubes are also extinguished, then the arrow terminal of rectifier RE8(1) will be at −50 volts. Furthermore, if the odd tube OD(1) is conducting or extinguished at the same time as the opposite condition exists in the odd counting tubes, then the arrow terminal of rectifier RE8(1) will be at substantially ground potential (the average of −50 volts and +50 volts).

Without undue repetition it will be observed that the cathode of the even tube E(1) and the cathodes of the even counting tubes 2(1), 4(1), 6(1), 8(1) and 0(1) combine to set the potential on the arrow side of the rectifier RE7(1) according to the average of the potentials supplied to the rectifier RE7(1) through resistances 144 and 148, which are fed respectively from the cathode of the even tube E(1) and from the load resistance 145 common to the cathode circuits of all even counting tubes.

Due to the arrangement of rectifiers RE7(1) and RE8(1), the right side of resistance 149 will assume a potential which is the more positive of the two potentials on the respective arrow sides of the rectifiers. That is, if the conduction through tube OD(1) coincides with the conduction through an odd counting tube or if the conduction through tube E(1) coincides with the conduction through an even counting tube, then the most positive potential of the arrow sides of said rectifiers will be +50 volts which is applied through resistance 149 to fire tube S(1). If, however, neither of the above two coincidences occurs, then the most positive potential which can exist at the arrow sides of rectifiers RE7(1) and RE8(1) will be substantially ground potential, which will be insufficiently positive with respect to the −50 volts on the cathode of tube S(1) to fire said tube.

It will be apparent at this point that the firing of tube S(1) indicates a satisfactory check that the firing of an odd or even tube OD(1) or E(1) from the pulse generation tube PG(1) coincides correctly with the firing respectively of an odd or an even counting tube in the counting chain 1(1) to 0(1). In the instant case, as will be recalled, tubes OD(1) and 1(1) are conducting. This coincidence drives the starter electrode of tube S(1) about 100 volts positive thereby firing tube S(1). When tube S(1) fires, tube BK(1) is extinguished by the positive pulse from the cathode of tube S(1) through the agency of the commutating condenser 150 interconnecting the cathodes of tubes S(1) and BK(1). When tube BK(1) is extinguished, its cathode returns to −50 volts (negative battery potential) as soon as condenser 150 discharges, thereby permitting condenser 130 in the starter electrode circuit of the trouble tube TRL(1) to discharge quickly through the rectifier RE1(1) which shunts resistance 128 for the purpose of discharge of condenser 130. Thus when tube S(1) fires, indicating a satisfactory check of the advance of the counting chain, the time delay measuring circuit for firing the trouble tube TRL(1) is immobilized, thereby preventing a trouble alarm.

On the other hand, if the counting tube 1(1) or the odd tube OD(1) had not fired properly, assuming that both would not become inoperative simultaneously, then other means comes into play to fire the trouble tube TRL(1) instead of the check tube S(1). Tube TRL(1) is energizable through two rectifiers RE5(1) and RE6(1) in a manner similar to the control of tube S(1) by rectifiers RE7(1) and RE8(1). However, the control of tube TRL(1) is different in that tube TRL(1) will be fired through the agency of its rectifier network only when a non-coincidence occurs. That is, by inspection, having previous discussion in mind, it will be observed that the arrow side of rectifier RE5(1) is set to a potential which is the average potential existing at the cathode of the even tube E(1) and at the cathode of any one of the odd counting tubes; whereas, the arrow side of rectifier RE6(1) is set to a potential which is the average potential existing at the cathode of the odd tube OD(1) and at the cathode of any one of the even counting tubes. Furthermore the starter electrode of tube TRL(1) is energized by the more positive of these two averages. If the firing of the odd tube OD(1) coincides with the firing of an even counting tube, then rectifier RE6(1) will deliver about a +50-volt pulse to tube TRL(1) to fire same and if the firing of the even tube E(1) coincides with the firing of any odd counting tube, then rectifier RE5(1) will deliver about a +50-volt pulse to tube TRL(1) to fire same. Any other condition will never raise the potential of the starter electrode of tube TRL(1) higher (more positive) than approximately ground potential which, of course, will not fire tube TRL(1).

Assuming that tube S(1) is fired according to previous description to indicate a satisfactory check of the advance of the counting chain, relay L(1) will reoperate at the end of the first pulse leaving tubes OD(1), 1(1) and S(1) conducting. When relay L(1) reoperates, relay S(1) is reenergized, condenser C1(1) is recharged, and the timing circuits associated with tubes RA(1) and RE(1) are again energized for timing an interdigital pause.

*Counting initial digit of one pulse*

An initial digit of one pulse, unless followed directly by a second digit of one pulse as will be explained, is assumed not to be a legitimate signal, because of the frequency with which such erroneous indication may be effected by accidental manipulation of the subscriber's dial, by spurious electrical impulses, etc. Such an initial digit is absorbed on the basis of the above assumption; but, as will be explained, it is not discarded in view of the fact that a second digit of one pulse is presumed to indicate a legitimate 11 prefix for a special code, such as a service code of 11X, where X may be any digit from 2 to 9.

In discussing the action of the pulse counting chain, the special 11X circuits, and the steering and registering circuits it will be assumed that the pulse generation and check circuits operate normally so as to indicate the proper advance of the counting chain. Previous discussion is adequate for an explanation of trouble conditions. The normal functioning of the pulse detection and checking circuits, as will be apparent from previous discussion, effects the following conditions:

(1) Each time that the line relay L(1) releases and reoperates to indicate a pulse of a digit, a pulse of about 100 volt positive nature is applied to the pulsing conductor 135; and, (2) Each time that the line relay L(1) remains operated for a sufficient time to represent an interdigital pause, tubes RA(1) and RE(1) fire in succession to apply one pulse each of about 100 volt positive amplitude to respective conductors 113 and 114, the pulse on conductor 114 following the pulse on conductor 113 by a timed period.

At the end of the first digit of one pulse, as above discussed, tube 1(1) will be conducting and tube ST(1) will be extinguished. Due to the conduction through tube 1(1), the upper terminals of the two gas diodes TD10(1) and TD11(1) connected to the cathode of tube 1(1) will be set at plus 50 volts after a delay of time after the firing of tube 1(1) necessary to charge condensers C3(1) and C4(1) to the newly applied potential. The lower terminals of tubes TD10(1) and TD11(1) are connected over respective conductors 210 and 211 in parallel to ground through resistances 208 and 209 and through respective condensers 206 and 207 to the upper terminals of respective gas diodes TDA0(2) and TDA1(2) of Fig. 2 associated with the A digit register tubes A0(2) to A(7).

The diodes TDA0(2), TDA1(2), TDA2(2), TDA4(2), and TDA7(2) are all controlled, as regards the potential on their upper terminals, from the cathode of the A digit steering tube A(2). With the tube A(2) non-conducting, its cathode, and thus the upper terminal of the A register diodes, is at negative battery potential (minus 50 volts) from conductor 203. The only time that a register tube, such as tube A0(2) or A1(2), can be fired to register a digit is when the two diodes, such as TD10(1) and TD11(1), associated with a counting tube, such as tube 1(1), can fire in cascade with two corresponding tubes, such as diodes TDA0(2) and TDA1(2) or TDB0(2) and TDB1(2), etc., or TDG0(2) and TDG1(2), associated with a particular group of register tubes. This condition exists only when the associated steering tube, such as tube A(2) is conducting and when the associated counting tube, such as tube 1(1) is conducting. When a counting tube, such as tube 1(1) is conducting, the 100 volt positive pulse from the tube RA(1) over conductor 113 will fire both associated diodes, such as diodes TD10(1) and TD11(1), because the 100 volt pulse will drive the upper terminals of the diodes to about plus 150 volts which is sufficient to fire them since their lower terminals are returned to ground over conductors 210 and 211 and through resistances 208 and 209. The resulting pulse of about plus 100 volts developed across these resistances 208 and 209 will attempt to fire all register tube diodes, such as TDA0(2) and TDA1(2), TDB0(2) and TDB1(2), etc., TDG0(2) and TDG1(2), associated therewith. 100 volts is insufficient to fire these diodes however, unless they have been enabled by having their upper terminals raised to plus 50 volts from minus 50 volts by the associated conducting steering tube, such as tube A(2). In the present instance, register tube diodes TDA0(2) and TDA1(2), as well as the corresponding diodes of other register groups, will not be fired because the associated steering tubes are non-conducting. Thus the pulse generated by tube RA(1) is not effective to register the first digit of one pulse. As soon as the pulse from tube RA(1) ceases, the diodes and such as TD10(1), TD11(1), which may have fired are extinguished.

A short interval after the pulse on conductor 113 from tube RA(1), tube RE(1) generates a 100-volt positive pulse on conductor 114, as has been described. The gas diode PPD(1) in the starter electrode circuit of tube PP(1) is controlled from three quarters. The pulsing conductor 114 from tube RE(1) is connected thereto through condenser 151. Also, the cathode of tube 1(1) is connected thereto through the resistance 152 and rectifier RE3(1). Furthermore, the cathode of tube ON2(1) is connected thereto through the resistance 153 and rectifier RE4(1). The right terminal of the gas diode PPD(1) is at ground potential through resistance 154 and therefore it will require a pulse of at least 100 positive volts to fire the diode PPD(1). The common connection between rectifiers RE3(1) and RE4(1) will, due to the polarity of such rectifiers, assume the more negative potential of the respective arrow terminals. At the end of the first digit of one pulse both cathodes of tubes 1(1) and ON2(1) are at plus 50 volts and thus the left terminal of the diode PPD(1) will be at plus 50 volts. The 100 volt positive pulse on conductor 114 from tube RE(1) will thus fire the gas diode PPD(1) and the latter, through the agency of the current surge in resistance 154, will fire the tube PP(1). The condenser 155 shunting the cathode resistance 156 of tube PP(1) holds the cathode of tube PP(1) at minus 50 volts long enough to prevent the firing of tube 11(1) on the first pulse from tube RE(1). Eventually condenser 155 becomes charged and the cathode of tube PP(1) rises to about plus 50 volts to condition the diode D11(1) so that it will fire tube 11(1) on a second digit of one pulse.

In addition, when tube RE(1) generates the interdigital pulse on conductor 114, the start tube ST(1) is refired over the contact 4 of relay BT(1). The resulting current surge through tube ST(1), as has been explained, extinguishes the tube 1(1) by anode commutation and the circuits are ready to receive the next digit.

It will be observed that none of the steering tubes, such as tubes A(2) to H(2), have been operated in response to the first digit of one pulse and that, although this first pulse has been absorbed by the firing of tube PP(1), the first pulse has not been discarded.

Furthermore, it will be seen that the above-described means for transferring the pulse count from the counting tubes of Fig. 1 to the register tubes of Fig. 2 involves two gas diodes for each counting tube, such as diodes TD10(1) and TD11(1) for counting tube 1(1). These diodes, under proper conditions as have also been indicated, will fire two-out-of-five register tubes, such as tubes A0(2) and A1(2). This two-out-of-five code is well known and is arranged as follows:

| Digit | Counting Chain Diodes Fired | Register Tube Diodes Fired | Register Tubes Fired |
|---|---|---|---|
| 1 | TD10(1)-TD11(1) | TDA0(2)-TDA1(2) | A0(2)-A1(2) |
| 2 | TD20(1)-TD22(1) | TDA0(2)-TDA2(2) | A0(2)-A2(2) |
| 3 | TD31(1)-TD32(1) | TDA1(2)-TDA2(2) | A1(2)-A2(2) |
| 4 | TD40(1)-TD44(1) | TDA0(2)-TDA4(2) | A0(2)-A4(2) |
| 5 | TD51(1)-TD54(1) | TDA1(2)-TDA4(2) | A1(2)-A4(2) |
| 6 | TD62(1)-TD64(1) | TDA2(2)-TDA4(2) | A2(2)-A4(2) |
| 7 | TD70(1)-TD77(1) | TDA0(2)-TDA7(2) | A0(2)-A7(2) |
| 8 | TD81(1)-TD87(1) | TDA1(2)-TDA7(2) | A1(2)-A7(2) |
| 9 | TD92(1)-TD97(1) | TDA2(2)-TDA7(2) | A2(2)-A7(2) |
| 0 | TD104(1)-TD107(1) | TDA4(2)-TDA7(2) | A4(2)-A7(2) |

*Counting a second digit of one pulse*

If a second digit of one pulse is received and counted by the originating register circuit, it is assumed that this is a legitimate indication of an 11 prefix to a special code such as a special 11X code of a service nature.

When relay L(1) releases on the first pulse of the second digit, the pulse generation tube PG(1) again produces a positive 100 volt pulse on the pulsing conductor 135. This pulse fires tube 1(1) which extinguishes the start tube ST(1) by anode commutation. Again, since tubes ON2(1) and 1(1) are both conducting, the left terminal of the gas diode, PPD(1) is raised to plus 50 volts. Since tube 1(1) is energized, the upper terminals of the gas diodes TD10(1) and TD11(1) are again raised to plus 50 volts.

When relay L(1) reoperates at the end of the first pulse and remains operated to indicate the time delay between digits, tube RA(1) fires to produces a 100 volt positive pulse on conductor 113. This pulse will, as before, fire the gas diodes TD10(1) and TD11(1) associated with the cathode of counting tube 1(1). However, since the steering tube A(2) of Fig. 2 has not been energized, the digit one, represented by the firing of the diodes TD10(1) and TD11(1), will not be registered in the A digit register tubes A0(2) and A1(2).

Subsequent to the firing of tube RA(1), tube RE(1) fires to produce on conductor 114 a 100 volt positive pulse. By virtue of the fact that tube PP(1) is conducting, as has been explained, the cathode thereof, and thus the left terminal of the gas diode D11(1) is raised to plus 50 volts. The pulse on conductor 114 will fire the diode D11(1) through condenser 157 thereby firing the tube 11(1). The cathode of tube 11(1) will be raised to plus 50 volts thereby raising the potential of conductor 201 from minus 50 volts to plus 50 volts. The energization of conductor 201 is an indication that an 11 prefix has been detected and registered in the counting circuit. This indication is used in a manner presently to be described. When tube 11(1) is fired it extinguishes tube PP(1) by cathode commutation through condenser 158.

Further detection of digits of one pulse each, whether intentional or not, will have the effect merely of alternating the conduction in tubes PP(1) and 11(1). A timing circuit (not shown) may be provided which, under this condition, will eventually call in a marker circuit for the purpose of switching the calling line to a permanent signal tone trunk to call in an operator for trouble analysis. Examples of such circuits are fully described in Busch and Dehn disclosures above-identified. Such circuit may also be used to indicate a total failure of the calling line to dial any digits at all or to indicate the receipt by the originating register of only one pulse followed by a continuous operation of the line relay L(1). Other trouble conditions may be met by other known circuits but, since the present invention is not particularly concerned with such expedients, none of these circuit means is shown or described.

*Counting and registering the X digit of an 11X code*

It will be assumed that, after the dialing of two digits of one pulse each, the calling subscriber dials a digit greater than one pulse, such as three pulses, to indicate a special 11X code.

Upon the first release of relay L(1), the resulting pulse on conductor 135 fires tube 1(1), thereby extinguishing tube ST(1). The second release of relay L(1) occurs before tubes RA(1) and RE(1) can fire and thus the second pulse on conductor 135 fires tube 2(1), thereby extinguishing tube 1(1). When tube 2(1) fires, its cathode is raised to plus 50 volts thereby producing a 100 volt positive pulse to the starter electrode of tube A2(1) over conductor 159. When tube A2(1) fires it extinguishes itself by virtue of the anode circuit arrangement of condenser 160 in shunt of the anode load resistance 161 as has been discussed. Tube A2(1), upon firing momentarily, raises its cathode to about plus 50 volts and the resulting 100 volt positive pulse is applied through condenser 162 to conductor 202. Since conductor 202 was originally at plus 50 volts due to conduction through tube ON2(1), the conductor 202 is now momentarily provided with a pulse extending to about plus 150 volts. This pulse will fire the gas diode DA(2) to in turn fire the steering tube A(2). Condenser 215 in the cathode circuit of tube A(2) will hold the cathode at minus 50 volts for a short length of time and then will permit the cathode to assume a potential of about plus 50 volts. This plus 50 volt potential will enable the gas diode DB(2) to be fired by the next pulse on conductor 205 from conductor 114 at the end of the next digit. This plus 50 volt potential from the cathode of tube A(2) also raises the potential of the upper terminals of diodes TDA0(2), TDA1(2), TDA2(2), TDA4(2), and TDA7(2) to about plus 50 volts such that this three pulse digit will be registered in the A digit register tubes.

When tube A(2) fires, the surge of current through retard coil L1(1) over conductor 200 extinguishes tube ON2(1). Tube ON2(1), upon ceasing to conduct, releases the dial tone relay DT(1).

Thus, it will be observed, digits may be registered in the registers of Fig. 2 only after a digit of more than one pulse is counted by the counting circuits of Fig. 1.

Relay L(1) will reoperate and release again before tubes RA(1) and RE(1) can fire thus producing a third pulse on conductor 135. This pulse will fire tube 3(1) which in turn will extinguish tube 2(1).

At this juncture tubes A(2), 3(1), and 11(1) will be operated. When relay L(1) releases at the end of the three pulse digit, tube RA(1) fires to produce a 100 volt positive pulse on conductor 113. This pulse will fire gas diodes TD31(1) and TD32(1) associated with the conducting tube 3(1). The firing of these diodes will create positive pulses across the resistances 209 and 216 respectively of Fig. 2 due to passage of current therethrough from the diodes over conductors 211 and 212. Since the upper terminals of the gas diodes TDA1(2) and TDA2(2) are at plus 50 volts due to conduction in tube A(2), the positive pulses across resistances 209 and 216 will fire these diodes, which, in turn, will cause surges of current in resistances 217 and 218 to fire tubes A1(2) and A2(2). The tubes A1(2) and A2(2) will remain conducting to indicate the registration, on a two-out-of-five basis, of the digit 3.

Subsequent to the pulse from tube RA(1), tube RE(1) fires to produce a 100 volt positive pulse on conductor 114. This pulse will refire tube ST(1), thereby extinguishing tube 3(1) to recycle the counting chain. This pulse will also be applied over conductor 205 to fire the diode DB(2) through condenser 219. The firing of diode DB(2) causes the B digit steering tube B(2) to conduct and to extinguish tube A(2) by anode commutation through the agency of retard coil L1(1). The condenser 223 across the cathode resistance 225 of tube B(2) holds the cathode at minus 50 volts long enough to prevent the firing of the diode DC(2) by the present pulse on conductor 205. Eventually, when the condenser 223 becomes charged, the cathode of tube B(2) will rise to plus 50 volts. This rise of potential primes the diodes TDB0(2), TDB1(2), TDB2(2), TDB4(2), and TDB7(2), for the B digit register so that two-out-of-five of these diodes will be fired to register the next digit. When tube A(2) was extinguished, the plus 50 volt priming potential was removed from the corresponding A digit register diodes so that the A digit register cannot be affected by subsequent digits. This arrangement of selectively firing gas diodes in cascade for the purpose of causing registrations is disclosed and claimed in Patent 2,678,409 to W. H. T. Holden of May 11, 1954.

On 11X codes it is the practice for the originating register to "call in" a marker circuit as soon as the X digit is registered in the A digit register. The indication that such has taken place is the firing of the B digit steering tube B(2). It will be recalled that the conduction by tube 11(1) raised the potential of conductor 201 from minus 50 volts to plus 50 volts by virtue of the connection of the cathode of tube 11(1) to conductor 201. When tube B(2) fires, its cathode raises the potential of conductor 226 from minus 50 volts to plus 50 volts. These two conductors 201 and 226 are connected to the top terminals of respective rectifiers R11(2) and R12(2). These rectifiers are arranged and poled such that their connected arrow terminals will assume a potential which is the more negative of the two potentials on conductors 201 and 226. If either or both of conductors 201 and 226 is at minus 50 volts, then the arrow terminals of rectifiers R11(2) and R12(2) will be at substantially minus 50 volts and tube H1(2) will not fire. However, if both of conductors 201 and 226 are at plus 50 volts, as they will be under the present conditions of an 11X code (a code of 113 in the example), then the arrow terminals of rectifier R11(2) and R12(2) will rise to about plus 50 volts and will therefore fire tube H1(2) through the rectifier R14(2).

When tube H1(2) fires, it extinguishes tube B(2) by anode commutation and operates the marker start relay MST(2). Relay MST(2), upon operating, causes the seizure of an idle marker circuit for the purposes of completing the desired call, which, in the case of an 11X service code, may be to a suitable operator.

*Regular seven digit local call*

For calls which are directed to local subscribers, there will be no 11 prefix and the digits dialed may represent the familiar A, B, and C office digits followed by four station numericals. In this case the first digit will be greater than one pulse and thus will be registered in the A digit register. The next six digits will be successively registered in the B, C, D, E, F, and G registers. At the end of the registration of the G or seventh digit, tube H(2) will be fired thereby operating relay MST(2) to seize an idle marker circuit for the purpose of completing the desired connections. During this sequence of operation, the tube H1(2) will not be fired when the B digit steering tube B(2) conducts because conductor 201 will be at minus 50 volts due to the fact that tube 11(1) was not fired.

*A zero operator call*

If the first digit dialed were the digit 0, representing ten pulses, the digit ten would be registered in the A digit register by the firing of register tubes A4(2) and A7(2). These two tubes would raise the potential of conductors 228 and 229, connected to their respective cathodes, from minus 50 volts to plus 50 volts. As was the case with the 11X codes, making conductors 201 and 226 both plus 50 volts, these two conductors 228 and 229 will increase the potential of the arrow terminals of rectifiers R9(2) and R10(2) from minus 50 volts to plus 50 volts thereby to fire tube H1(2) and operate relay MST(2). This action seizes an idle marker after the first digit is registered for the purposes of switching the calling subscriber's line circuit to an operator, as desired.

*Marker operation*

When an idle marker (not shown) is seized due to the operation of relay MST(2), the register tubes of Fig. 2 are connected to the seized marker over cable 230 for the purpose of transferring the registered information to the marker. The transfer is made by circuits in the marker which can detect which cathodes of which register tubes are at plus 50 volts. The marker is also supplied (by means not shown) with other information concerning the call, such as the location of the calling subscriber's line circuit in the office plant, the class of service to which the calling subscriber is entitled, the nature of the call (11X call, zero operator call, etc), etc. From this information the marker proceeds to supply the service requested.

While the invention has been disclosed herein by way of example as embodied in a circuit using cold cathode gas discharge tubes, it will be an obvious modification within the skill of the art to substitute hot cathode thyratrons for the cold cathode tubes, in order for instance to embody added speed of operation in the circuits.

Furthermore, with regard to the voltage responsive gates, which in the exemplary embodiment comprise gas discharge cold cathode diodes, it will be an obvious modification to substitute for these diodes other known suitable gating means, such, for instance, as dry rectifiers or the like.

As far as the utility of the present invention is concerned, while it has been disclosed herein as embodied in a decimal or decade counter circuit arrangement, it will be apparent to those skilled in the art that the invention may be applied within its spirit and scope to other similar circuit arrangements, such as binary counters, digital computer circuits, etc.

It is to be understood that the above-described arrangements are merely illustrative of the application of the principles of the invention. Numerous other arrangements may be devised by those skilled in the art without departing from the spirit and scope of the invention.

What is claimed is:

1. In a signaling system, a source of pulses, an electronic discharge tube counting chain, a pair of electron discharge tubes, control means for applying a train of pulses concurrently to said counting chain and to said pair of tubes, said counting chain responsive to said control means to alter the conducting condition of successive tubes of said chain in response to successive pulses of a train, said pair of tubes responsive to said control means to cause one of said pair to conduct and the other to become extinguished alternately in response to alternate pulses of a train, and means for detecting whether or not said counting chain and said pair of tubes respond concurrently to successive pulses of a train.

2. In a signaling system, a source of pulses, a gas tube counting chain, a pair of gas tubes, control means for applying a train of pulses concurrently to said chain and to said pair, said chain responsive to said control means to cause conduction in successive tubes of said chain in response to successive pulses of a train, said pair responsive to said control means to cause conduction in alternate ones of said pair in response to alternate pulses of a train, and means for detecting whether or not said chain and said pair respond concurrently to successive pulses of a train.

3. In a signaling system, a source of pulses, a gas tube counting chain, a pair of tubes comprising an odd gas tube and an even gas tube, control means for applying a train of pulses to said chain, the first pulse of said train causing conduction in the first tube of said chain, commutating means interposed between successive tubes of said chain whereby successive tubes of said chain are rendered conducting in response to successive pulses, said control means arranged to apply said train of pulses concurrently to said pair of tubes, the first pulse of said train causing conduction in said odd tube, commutation means interposed between said pair of tubes whereby alternate ones of said pair of tubes are rendered conducting in response to alternate pulses, and means for detecting whether or not said counting chain and said pair of tubes respond concurrently to successive pulses of a train.

4. In a signaling system, a source of pulses, a gas tube counting chain, a pair of tubes comprising an odd gas tube and an even gas tube, control means for applying a train of pulses to said chain, the first pulse of said train causing conduction in the first tube of said chain, commutating means interposed between successive tubes of said chain whereby successive tubes of said chain are rendered conducting in response to successive pulses, said control means arranged to apply said train of pulses concurrently to said pair of tubes, the first pulse of said train causing conduction in said odd tube, commutation means interposed between said pair of tubes whereby alternate ones of said pair of tubes are rendered conducting in response to alternate pulses, means for detecting whether or not said counting chain and said pair of tubes respond concurrently to successive pulses of a train, means operated under the control of said detecting means to indicate concurrent response, and means operated under the control of said detecting means to indicate the failure of concurrent response.

5. In a signaling system, a source of pulses, a common pulsing conductor, a gas tube counting chain, a pair of cooperating gas tubes comprising an odd gas tube and an even gas tube, a control gas tube rendered conducting in response to each pulse, means for applying a pulse over said conductor to said counting chain in response to each conduction in said control tube, the first pulse causing conduction in the first tube of said chain, commutating means interposed between successive tubes of said chain whereby successive tubes are rendered conducting in response to successive pulses, means for applying a pulse over said conductor to said pair of tubes in response to each conduction in said control tube and independently of said counting chain, the first pulse causing conduction in said odd tube, commutating means interposed between said pair of tubes whereby alternate ones of said pair are rendered conducting in response to alternate pulses, means for detecting whether or not said counting chain and said pair of tubes respond concurrently and independently to successive pulses of a train, a check tube, and a trouble tube, said detecting means arranged to cause conduction in said check tube to indicate concurrent response and to cause conduction in said trouble tube to indicate a failure of concurrent response, and circuit means controlled by said check tube for causing said control tube to be extinguished solely in response to conduction in said check tube.

6. The invention as claimed in claim 5 wherein said detecting means comprises a voltage responsive means controlled jointly from said counting chain and from said pair of odd and even tubes.

7. The invention as claimed in claim 6 wherein said voltage responsive means comprises a network of asymmetric impedance devices interconnecting said counting chain and said pair of odd and even tubes with said check tube and said trouble tube.

8. The invention as claimed in claim 7 wherein said asymmetric impedance devices comprise rectifiers.

9. The invention as claimed in claim 8 wherein said rectifiers are so arranged in relation to each other and to the counting tubes, to the pair of odd and even tubes, to the check tube and to the trouble tube such that whenever an odd counting tube and the even tube of said pair are conducting concurrently or whenever an even counting tube and the odd tube of said pair are conducting concurrently said rectifiers will cause conduction in said trouble tube and such that whenever an odd counting tube and the odd tube of said pair are conducting concurrently or whenever an even counting tube and the even tube of said pair are conducting concurrently said rectifiers will cause conduction in said check tube.

10. The invention as claimed in claim 9 wherein said counting tubes, said pair of odd and even tubes, said check tube and said trouble tube are three-element gas tubes and wherein said rectifiers interconnect the cathodes of said counting tubes and of said pair of tubes with the starter electrodes of said check tube and of said trouble tube.

11. The invention as claimed in claim 10 wherein a first group of said rectifiers interconnects the cathodes of the even counting tubes and of the odd tube of said pair with the starter electrode of said trouble tube and a second group of rectifiers interconnects the cathodes of the odd counting tubes and of the even tube of said pair with the starter electrode of said trouble tube and a third group of rectifiers interconnects the cathodes of the even counting tubes and of the even tube of said pair with the starter electrode of said check tube and a fourth group of rectifiers interconnects the cathodes of the odd counting tubes and of the odd tube of said pair with the starter electrode of said check tube.

12. The invention as claimed in claim 11 wherein each group of rectifiers includes at least one rectifier exclusive thereto.

13. In a signaling system, a source of pulses, a common pulsing conductor, means for applying a train of pulses from said source over said conductor, step-by-step counting means responsive to a train of pulses on said conductor to be advanced thereby step by step, a dual condition means responsive concurrently with and independently of said counting means to a train of pulses on said conductor to assume alternate conditions in response to alternate pulses of a train, and means for detecting whether or not said counting means and said dual condition means respond concurrently and independently to a train of pulses on said conductor.

14. In a signaling system, a source of pulses, a common pulsing conductor, step-by-step counting means, control means for applying a train of pulses from said source over said conductor to said counting means whereby said counting means is advanced one step for each pulse of said train, a dual condition means, control means for applying a train of pulses from said source over said conductor to said dual condition means independently of said counting means whereby the condition of said dual condition means is altered for each successive pulse of said train concurrently with and independently of the action of said counting means, and means for detecting whether or not said counting means and said dual condition means respond concurrently and independently to successive pulses of a train.

15. In a signaling system, a source of pulses, a common pulsing conductor, step-by-step counting means, a dual condition means, control means for applying a train of pulses from said source over said conductor concurrently and independently to said counting means and to said dual condition means, said counting means responsive to said control means to advance one step for each pulse of said train, said dual condition means responsive to said control means independently of the action of said counting means to assume one condition for each even pulse of said train and the other condition for each odd pulse of said train, and means for detecting whether or not said counting means and said dual condition means respond concurrently and independently to successive pulses of said train.

16. In a signaling system, a source of pulses, a common pulsing conductor, an electronic discharge tube counting chain, a pair of electron discharge tubes, control means for applying a train of pulses from said source over said conductor concurrently and independently to said counting chain and to said pair of tubes, said counting chain responsive to said control means to alter the conducting condition of successive tubes of said chain in response to successive pulses of a train, said pair of tubes responsive to said control means independently of said counting chain to cause one of said pair to conduct and the other to become extinguished alternately in response to alternate pulses of a train, and means for detecting whether or not said counting chain and said pair of tubes respond concurrently and independently to successive pulses of a train.

17. In a signaling system, a source of pulses, a common pulsing conductor, a gas tube counting chain, a pair of gas tubes, control means for applying a train of pulses from said source over said conductor concurrently and independently to said chain and to said pair, said chain responsive to said control means to cause conduction in successive tubes of said chain in response to successive pulses of a train, said pair responsive to said control means independently of said counting chain to cause conduction in alternate ones of said pair in response to alternate pulses of a train, and means for detecting whether or not said chain and said pair respond concurrently and independently to successive pulses of a train.

18. In a signaling system, a source of pulses, a common pulsing conductor, a gas tube counting chain, a pair of tubes comprising an odd gas tube and an even gas tube, control means for applying a train of pulses from said source over said conductor to said chain, the first pulse of said train causing conduction in the first tube of said chain, commutating means interposed between successive tubes of said chain whereby successive tubes of said chain are rendered conducting in response to successive pulses, said control means arranged to apply said train of pulses from said source over said conductor concurrently to said pair of tubes independently of said counting chain, the first pulse of said train causing conduction in said odd tube, commutating means interposed between said pair of tubes whereby alternate ones of said pair of tubes are rendered conducting in response to alternate pulses, and means for detecting whether or not said counting chain and said pair of tubes respond concurrently and independently to successive pulses of a train.

19. In a signaling system, a source of pulses, a common pulsing conductor, a gas tube counting chain, a pair of tubes comprising an odd gas tube and an even gas tube, control means for applying a train of pulses from said source over said conductor to said chain, the first pulse of said train causing conduction in the first tube of said chain, commutating means interposed between successive tubes of said chain whereby successive tubes of said chain are rendered conducting in response to successive pulses, said control means arranged to apply said train of pulses from said source over said conductor concurrently to said pair of tubes independently of said counting chain, the first pulse of said train causing conduction in said odd tube, commutating means interposed between said pair of tubes whereby alternate ones of said pair of tubes are rendered conducting in response to alternate pulses, means for detecting whether or not said counting chain and said pair of tubes respond concurrently and independently to successive pulses of a train, means operated under the control of said detecting means to indicate concurrent response, and means operated under the control of said detecting means to indicate the failure of concurrent response.

20. In a signaling system, a source of pulses, a gas tube counting chain, a pair of cooperating gas tubes comprising an odd gas tube and an even gas tube, a control gas tube rendered conducting in response to each pulse, means for applying a pulse to said counting chain in response to each conduction in said control tube, the first pulse causing conduction in the first tube of said chain, commutating means interposed between successive tubes of said chain whereby successive tubes are rendered conducting in response to successive pulses, means for applying a pulse to said pair of tubes in response to each conduction in said control tube, the first pulse causing conduction in said odd tube, commutating means interposed between said pair of tubes whereby alternate ones of said pair are rendered conducting in response to alternate pulses, means for detecting whether or not said counting chain and said pair of tubes respond concurrently to successive pulses of a train, a check tube, and a trouble tube, said detecting means arranged to cause conduction in said check tube to indicate concurrent response and to cause conduction in said trouble tube to indicate a failure of concurrent response, and circuit means controlled by said check tube for causing said control tube to be extinguished solely in response to conduction in said check tube.

References Cited in the file of this patent

UNITED STATES PATENTS

| Number | Name | Date |
|---|---|---|
| 1,726,009 | White | Aug. 27, 1929 |
| 2,088,793 | Judge | Aug. 3, 1937 |
| 2,373,134 | Massonneau | Apr. 10, 1945 |
| 2,589,465 | Weiner | Mar. 18, 1952 |
| 2,597,428 | Bachelet | May 20, 1952 |